United States Patent
Kim et al.

(10) Patent No.: US 9,431,652 B2
(45) Date of Patent: Aug. 30, 2016

(54) ANODE ACTIVE MATERIAL FOR LITHIUM SECONDARY BATTERY, METHOD OF PREPARING THE SAME, AND LITHIUM SECONDARY BATTERY INCLUDING THE ANODE ACTIVE MATERIAL

(71) Applicant: LG Chem, Ltd., Seoul (KR)

(72) Inventors: Hyun Chul Kim, Daejeon (KR); Yong Ju Lee, Daejeon (KR); Je Young Kim, Daejeon (KR); Yoon Ah Kang, Daejeon (KR)

(73) Assignee: LG Chem, Ltd. (KR)

( * ) Notice: Subject to any disclaimer, the term of this patent is extended or adjusted under 35 U.S.C. 154(b) by 279 days.

(21) Appl. No.: 14/178,481

(22) Filed: Feb. 12, 2014

(65) Prior Publication Data
US 2014/0178754 A1 Jun. 26, 2014

Related U.S. Application Data

(63) Continuation of application No. PCT/KR2013/011596, filed on Dec. 13, 2013.

(30) Foreign Application Priority Data

Dec. 21, 2012 (KR) .................. 10-2012-0150766
Dec. 11, 2013 (KR) .................. 10-2013-0154124

(51) Int. Cl.
*H01M 4/134* (2010.01)
*H01M 4/36* (2006.01)
(Continued)

(52) U.S. Cl.
CPC ............ *H01M 4/366* (2013.01); *H01M 4/131* (2013.01); *H01M 4/485* (2013.01); *H01M 4/587* (2013.01); *H01M 4/625* (2013.01); *B82Y 30/00* (2013.01); *B82Y 40/00* (2013.01); *H01M 10/052* (2013.01);
(Continued)

(58) Field of Classification Search
None
See application file for complete search history.

(56) References Cited

U.S. PATENT DOCUMENTS

2007/0092796 A1  4/2007  Matsuda et al.
2007/0099081 A1  5/2007  Matsuda et al.
(Continued)

FOREIGN PATENT DOCUMENTS

JP  2004349056 A  12/2004
JP  2005-158721 A  6/2005
(Continued)

OTHER PUBLICATIONS

Machine translation of JP2007-329001. Printed Sep. 2, 2015.*
(Continued)

*Primary Examiner* — Maria J Laios
(74) *Attorney, Agent, or Firm* — Lerner, David, Littenberg, Krumholz & Mentlik, LLP

(57) ABSTRACT

Provided are an anode active material including silicon oxide particles (SiOx, where x satisfies 0<x<2), fiber-type carbon grown on the silicon oxide particles, and a carbon coating layer formed on surfaces of the silicon oxide particles and the fiber-type carbon, and a method of preparing the anode active material.

Since the anode active material of the present invention is used in an anode of a lithium secondary battery, conductivity may not only be improved but the physical bonding force between the silicon oxide particles and the fiber-type carbon may also be increased. Thus, the performance of the battery may be improved by addressing limitations related to the exfoliation of the fiber-type carbon which may occur due to the volume change of silicon oxide.

18 Claims, 2 Drawing Sheets

(51) Int. Cl.
*H01M 4/131* (2010.01)
*H01M 4/485* (2010.01)
*H01M 4/587* (2010.01)
*H01M 4/62* (2006.01)
*B82Y 30/00* (2011.01)
*H01M 10/052* (2010.01)
*B82Y 40/00* (2011.01)

(52) U.S. Cl.
CPC ............ *Y02E 60/122* (2013.01); *Y10S 977/742* (2013.01); *Y10S 977/948* (2013.01)

(56) References Cited

U.S. PATENT DOCUMENTS

| | | |
|---|---|---|
| 2008/0160490 A1 | 7/2008 | Gomes et al. |
| 2008/0193831 A1 | 8/2008 | Mah et al. |
| 2010/0159331 A1 | 6/2010 | Lee et al. |
| 2011/0123858 A1 | 5/2011 | Zaghib et al. |
| 2012/0007028 A1 | 1/2012 | Hwang et al. |
| 2012/0288742 A1 | 11/2012 | Tanaka et al. |
| 2013/0059203 A1 | 3/2013 | Hong et al. |

FOREIGN PATENT DOCUMENTS

| | | | | |
|---|---|---|---|---|
| JP | 2007-329001 | * | 6/2006 | ............... H01M 4/38 |
| JP | 2007-329001 A | | 12/2007 | |
| JP | 2007-335198 A | | 12/2007 | |
| JP | 2008198610 A | | 8/2008 | |
| KR | 2010-0073506 A | | 7/2010 | |
| KR | 2011-0102844 A | | 9/2011 | |
| KR | 2011-0124728 A | | 11/2011 | |
| WO | 2012036127 A1 | | 3/2012 | |

OTHER PUBLICATIONS

Search Report from European Application No. 13834352.0, dated Feb. 27, 2015.
International Search Report from PCT/KR2013/011596, dated Mar. 25, 2014.

* cited by examiner

ANODE ACTIVE MATERIAL FOR LITHIUM SECONDARY BATTERY, METHOD OF PREPARING THE SAME, AND LITHIUM SECONDARY BATTERY INCLUDING THE ANODE ACTIVE MATERIAL

CROSS-REFERENCE TO RELATED APPLICATIONS

The present application is a continuation of International Application No. PCT/KR2013/011596 filed on Dec. 13, 2013, which claims the benefit of Korean Patent Application No. 10-2012-0150766, filed Dec. 21, 2012 and Korean Patent Application No. 10-2013-0154124, filed Dec. 11, 2013, the disclosures of which are incorporated herein by reference.

TECHNICAL FIELD

The present invention relates to an anode active material for a lithium secondary battery, a method of preparing the same, and a lithium secondary battery including the anode active material, and more particularly, to an anode active material including a carbon coating layer on surfaces of silicon oxide particles and fiber-type carbon that is grown on the silicon oxide particles, a method of preparing the same, and a lithium secondary battery including the anode active material.

BACKGROUND ART

Lithium secondary batteries, which are recently in the spotlight as a power source of portable and small electronic devices, may exhibit high discharge voltages that are two times or more than those of batteries using a typical alkaline aqueous solution by using an organic electrolyte solution. Thus, the lithium secondary batteries exhibit high energy density.

Graphite is mainly used as an anode active material of the lithium secondary battery. However, graphite has a low capacity per unit mass of 372 mAh/g and a high-capacity lithium secondary battery may be difficult to be prepared by using graphite.

As an anode active material exhibiting higher capacity than graphite, a material forming an intermetallic compound with lithium, such as silicon, tin, and an oxide thereof, may be promising. However, volumes of the above materials may expand because crystal structures thereof may be changed when absorbing and storing lithium. When silicon absorbs and stores the maximum amount of lithium, the silicon may be transformed into $Li_{4.4}Si$ and the volume of $Li_{4.4}Si$ may expand due to charging. With respect to the rate of increase in volume due to the charging, the volume may expand up to about 4.12 times the volume of the silicon before the volume expansion.

Therefore, a significant amount of research into an increase in the capacity of an anode active material, such as silicon, i.e., a decrease in a volume expansion coefficient by alloying of silicon, has been conducted. However, since a metal, such as silicon (Si), tin (Sn), and aluminum (Al), is alloyed with lithium during charge and discharge, volume expansion and contraction may occur. Thus, cycle characteristics of the battery may degrade.

Although silicon is known as an element that may most likely provide high capacity, it may be very difficult to amorphize silicon itself alone and it may be also difficult to amorphize an alloy including silicon as a main component. However, a method of easily amorphizing a silicon-based material has recently been developed by using mechanical alloying.

For example, as a method of preparing an anode active material for a lithium secondary battery using a silicon alloy, a method of preparing an anode active material has been developed, in which powders of a silicon element and an element M (where M is nickel (Ni), cobalt (Co), boron (B), chromium (Cr), copper (Cu), iron (Fe), manganese (Mn), titanium (Ti), or yttrium (Y)) are alloyed by mechanical alloying to form a SiM alloy, the SiM alloy is heat treated, and the heat-treated SiM alloy is then alloyed with powder of an element X (where X is silver (Ag), copper (Cu), and gold (Au)) by mechanical alloying to obtain a SiMX alloy.

However, with respect to the anode active material for a lithium secondary battery prepared by the above method, its charge and discharge capacity may be decreased due to the degradation of silicon as charge and discharge cycles proceed. With respect to the mechanical alloying, since the destruction of an alloy structure may occur due to the intercalation and deintercalation of lithium, the cycle characteristics may degrade.

Therefore, there is a need to develop an anode active material which may replace a typical anode active material and may improve discharge capacity, efficiency, and lifetime characteristics when used in the lithium secondary battery.

DISCLOSURE OF THE INVENTION

Technical Problem

The present invention provides an anode active material for a lithium secondary battery which may improve the performance of a battery by increasing the physical bonding force between silicon oxide particles and fiber-type carbon as well as improving conductivity to address limitations related to the exfoliation of the fiber-type carbon that may occur due to the volume change of silicon oxide, and a method of preparing the same.

Technical Solution

According to an aspect of the present invention, there is provided an anode active material including silicon oxide particles ($SiO_x$, where x satisfies $0<x<2$); fiber-type carbon grown on the silicon oxide particles; and a carbon coating layer formed on surfaces of the silicon oxide particles and the fiber-type carbon.

According to another aspect of the present invention, there is provided a method of preparing an anode active material including the steps of: (i) forming a composite by dispersing a catalytic metal on silicon oxide particles (SiOx, where x satisfies $0<x<2$) and performing a heat treatment in the presence of a carbon source to grow fiber-type carbon; and (ii) forming a carbon coating layer by coating the composite with carbon and performing a heat treatment.

According to another aspect of the present invention, there is provided an anode including a current collector and the anode active material formed at least one surface of the current collector. According to another aspect of the present invention, there is provided a lithium secondary battery including a cathode, the anode, and a separator disposed between the cathode and the anode.

Advantageous Effects

Since an anode active material of the present invention, in which a carbon coating layer is formed on surfaces of silicon oxide particles and fiber-type carbon grown on the silicon oxide particles, is used in a lithium secondary battery, conductivity may not only be improved but physical contact between the silicon oxide particles and the fiber-type carbon may also be further increased. Thus, the performance of the battery may be further improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
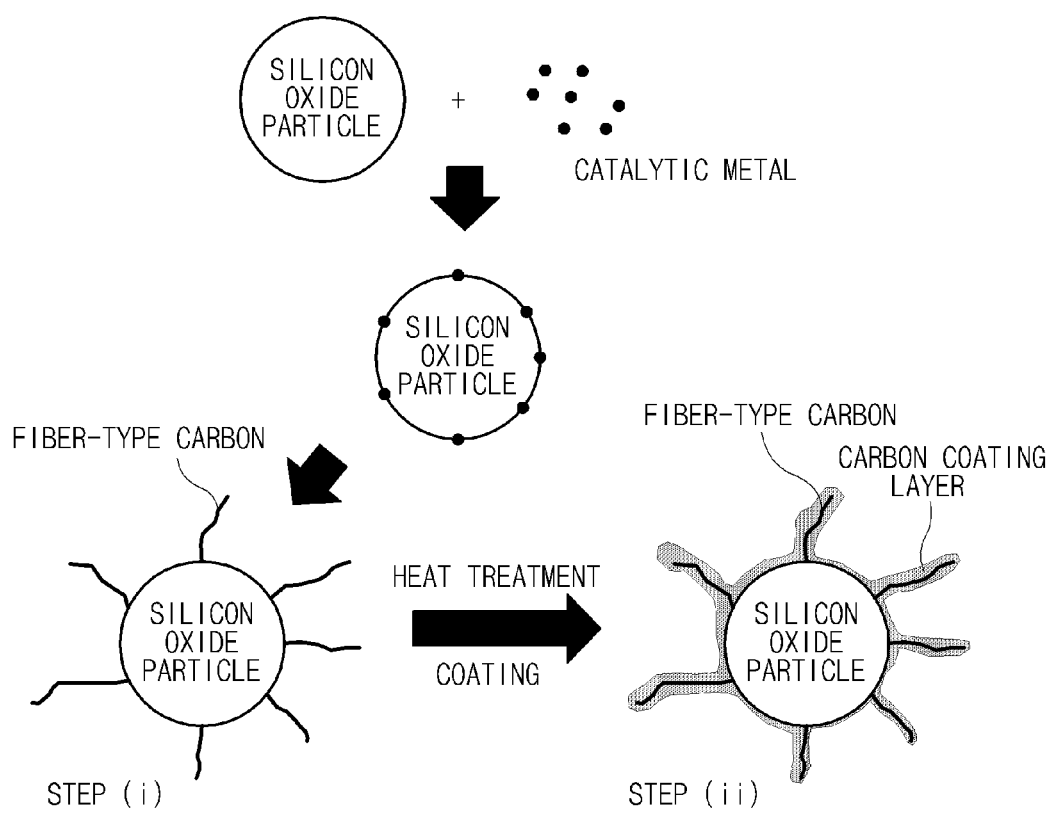
FIG. 1 is a schematic view illustrating a method of preparing an anode active material according to an embodiment of the present invention.

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

An anode active material for a lithium secondary battery of the present invention may include silicon oxide particles (SiOx, where x satisfies 0<x<2); fiber-type carbon grown on the silicon oxide particles; and a carbon coating layer formed on surfaces of the silicon oxide particles and the fiber-type carbon.

According to an embodiment of the present invention, since fiber-type carbon is directly grown on silicon oxide particles, sufficient conductivity may be secured even in the case in which a small amount of a conductive agent is used. As a result, initial efficiency and cycle characteristics of a secondary battery may be improved. In addition, since a carbon coating layer is formed on the surfaces of the silicon oxide particles and the fiber-type carbon, a bonding force between the surfaces of the silicon oxide particles and the fiber-type carbon may be further increased to address limitations related to the exfoliation of the fiber-type carbon that may occur due to the volume change of silicon oxide. Thus, the performance of the battery may be further improved.

According to an embodiment of the present invention, the carbon coating layer may be formed to cover a portion or all of the surfaces of the silicon oxide particles and the fiber-type carbon. However, the carbon coating layer may be formed to cover all of the surfaces of the silicon oxide particles and the fiber-type carbon in terms of the performance of the secondary battery.

An average particle diameter of the silicon oxide particles used according to an embodiment of the present invention may be in a range of 4 μm to 45 μm. In this case, it may be advantageous to prepare the particle diameter of the silicon oxide particles as small as possible for maximizing disorder in a direction of expansion for each particle so as to prevent the expansion of the particles due to the charge of lithium ions. When the maximum particle diameter is greater than 45 μm, the expansion may increase to decrease binding characteristics between the particles and binding characteristics between the particles and a current collector as charge and discharge are repeated. Thus, cycle characteristics may significantly degrade.

In the present invention, the average particle diameter ($D_{50}$) of the silicon oxide particles may be defined as a particle diameter at 50% in a cumulative particle diameter distribution. For example, the average particle diameter ($D_{50}$) of the silicon oxide particles according to an embodiment of the present invention may be measured by using a laser diffraction method. The laser diffraction method may generally measure a particle diameter ranging from a submicron level to a few mm, and may obtain highly repeatable and high resolution results.

In general, silicon (Si) may exhibit high capacity characteristics in comparison to a carbon-based material. However, Si may agglomerate one another due to low dispersibility and uniform conductivity may not be secured. Therefore, a large amount of the conductive agent may be required in order to address the above problem, and as a result, decreases in the capacity and initial efficiency of the battery may occur. Also, a volume change of 300% or more may occur before and after a reaction with lithium, i.e., during the charge and discharge.

According to an embodiment of the present invention, since the silicon oxide particles having a smaller volume change than silicon are used in order to address the above limitation, the limitation of the volume change may be minimized. Also, since the fiber-type carbon is directly grown on the silicon oxide particles, limitations of low initial efficiency and cycle characteristics of the silicon oxide particles for a high-capacity lithium secondary battery may be addressed without using the large amount of the conductive agent.

However, since the volume change according to the use of the silicon oxide particles may still occur and the fiber-type carbon and the silicon oxide particles are not chemically and physically bonded to one another, the fiber-type carbon may be detached from the silicon oxide particles during the preparation of a slurry or the operation of the battery or the exfoliation of the fiber-type carbon may occur due to weak electrical contact. Thus, the lifetime of the battery may be reduced.

Accordingly, the present invention may address the above issue while further providing conductivity by coating the surfaces of the fiber-type carbon grown on the silicon oxide particles as well as the silicon oxide particles with carbon.

Also, a method of preparing an anode active material according to an embodiment of the present invention will be described in detail with reference to FIG. 1.

That is, referring to FIG. 1, the method of preparing an anode active material according to the embodiment of the present invention may include the steps of: (i) forming a composite by dispersing a catalytic metal on silicon oxide particles (SiOx, where x satisfies 0<x<2) and performing a heat treatment in the presence of a carbon source to grow fiber-type carbon; and (ii) forming a carbon coating layer by coating the composite with carbon and performing a heat treatment.

First, according to an embodiment of the present invention, the forming of the composite by growing the fiber-type carbon on the silicon oxide particles in the step (i) may be performed by using a typical method known in the art. Specifically, for example, a catalytic metal may be dispersed on the silicon oxide particles by using a compound including the catalytic metal, and fiber-type carbon may be vapor grown by performing a heat treatment in an inert gas in the presence of a carbon source.

The catalytic metal may include any one selected from the group consisting of iron (Fe), nickel (Ni), cobalt (Co), calcium (Ca), yttrium (Y), and magnesium (Mg), or a mixed metal of two or more thereof. The compound including the catalytic metal may include any one selected from the group consisting of $CaCO_3$, $Co(NO_3).6H_2O$, $Fe(NO_3).6H_2O$, $Ni(NO_3).6H_2O$, $Y(NO_3).6H_2O$, and $Mg(NO_3).6H_2O$, or a mixture of two or more thereof.

The heat treatment in the step (i) may be performed in a temperature range of 100° C. to 1,000° C. in an inert gas, such as argon gas or nitrogen gas, atmosphere.

Also, the carbon source according to an embodiment of the present invention, for example, may include any one selected from the group consisting of methane, ethane, ethylene, butane, acetylene, carbon monoxide, propane, and propylene, or a mixture of two or more thereof.

The fiber-type carbon may include carbon nanotubes, carbon nanofibers, or a mixture thereof. The grown fiber-type carbon may have a diameter of 1 nm to 500 nm and a length of 100 nm to 5 μm.

Also, the anode active material according to an embodiment of the present invention may include the fiber-type carbon in an amount of 0.1 parts by weight to 20 parts by weight based on 100 parts by weight of the silicon oxide particles.

Furthermore, in order to further increase the bonding force between the silicon oxide particles and the fiber-type carbon and to prevent the exfoliation of the fiber-type carbon that may occur due to the volume change of the silicon oxide particles, a carbon coating layer may be formed on the composite by coating the surfaces of the silicon oxide particles and the fiber-type carbon grown on the silicon oxide particles with carbon and performing a heat treatment as in the step (ii).

According to an embodiment of the present invention, the coating may include coating by pyrolytic carbon using any one selected from the group consisting of methane, ethane, ethylene, butane, acetylene, carbon monoxide, propane, and propylene, or a gas-phase or liquid-phase carbon source of two or more thereof; or coating by liquid-phase and solid-phase pitch.

Also, the heat treatment may be performed in a temperature range of 300° C. to 1,400° C. In the case that the heat treatment is performed at a temperature of less than 300° C., since a residual organic material or inorganic material may remain, the resistance of the coating layer may increase and the formation of the carbon coating layer may be difficult. In the case in which the heat treatment is performed at a temperature of greater than 1,400° C., the particles may be fused or agglomerated, and the coating layer may not be uniformly formed on a fused or agglomerated portion.

The silicon oxide particles and the fiber-type carbon may be entirely uniformly or non-uniformly coated with the carbon coating layer thus formed. In the carbon coating layer, a coating amount of carbon is not particularly limited.

However, the coating amount of carbon, for example, may be in a range of 5 parts by weight to 20 parts by weight based on 100 parts by weight of the anode active material. In the case that the coating amount of carbon is less than 5 parts by weight, an effect of improving the binding characteristics between the silicon oxide particles and the fiber-type carbon grown on the silicon oxide particles may not be sufficient, and thus, the cycle characteristics may degrade. Also, in the case in which the coating amount of carbon is greater than 20 parts by weight, since the amount of Si that may react with lithium (Li) is decreased as the amount of carbon increases, charge and discharge capacity may decrease.

According to an embodiment of the present invention, the carbon coating layer may be formed to cover a portion or all of the surfaces of the silicon oxide particles and the fiber-type carbon. However, the carbon coating layer may be formed to cover all of the surfaces of the silicon oxide particles and the fiber-type carbon in terms of the performance of the secondary battery.

The present invention may provide an anode including a current collector and the anode active material for a lithium secondary battery that is formed on at least one surface of the current collector, according to a typical method in the art.

Also, similar to the anode, a cathode, according to the present invention, may be prepared by a typical method in the art.

For example, cathode active material and anode active material of the present invention are respectively mixed with a binder, a solvent, and a conductive agent and a dispersant if necessary, and stirred to prepare slurries. Then, current collectors may be respectively coated with the slurries and pressed to prepare electrodes.

Various types of binder polymers, such as a polyvinylidene fluoride-hexafluoropropylene copolymer (PVDF-co-HEP), polyvinylidene fluoride, polyacrylonitrile, and polymethylmethacrylate, may be used as the binder that is used in the present invention.

Lithium-containing transition metal oxide may be used as the cathode active material. For example, any one selected from the group consisting of $Li_xCoO_2(0.5<x<1.3)$, $Li_xNiO_2$ $(0.5<x<1.3)$, $Li_xMnO_2(0.5<x<1.3)$, $Li_xMn_2O_4(0.5<x<1.3)$, $Li_x(Ni_aCo_bMn_c)O_2(0.5<x<1.3, 0<a<1, 0<b<1, 0<c<1, a+b+c=1)$, $Li_xNi_{1-y}Co_yO_2(0.5<x<1.3, 0<y<1)$, $Li_xCo_{1-y}Mn_yO_2$ $(0.5<x<1.3, 0≤y<1)$, $Li_xNi_{1-y}Mn_yO_2(0.5<x<1.3, 0≤y<1)$, $Li_x(Ni_aCo_bMn_c)O_4(0.5<x<1.3, 0<a<2, 0<b<2, 0<c<2, a+b+c=2)$, $Li_xMn_{2-z}Ni_zO_4(0.5<x<1.3, 0<z<2)$, $Li_xMn_{2-z}Co_zO_4$ $(0.5<x<1.3, 0<z<2)$, $Li_xCoPO_4(0.5<x<1.3)$, and $Li_xFePO_4$ $(0.5<x<1.3)$, or a mixture of two or more thereof may be used. The lithium-containing transition metal oxide may be coated with a metal, such as aluminum (Al), or a metal oxide. Also, sulfide, selenide, and halide may be used in addition to the lithium-containing transition metal oxide.

Furthermore, the present invention may provide a lithium secondary battery including a cathode, an anode, a separator disposed between the cathode and the anode, and an electrolyte solution.

In the electrolyte solution used in the present invention, a lithium salt, which may be included as an electrolyte, may be used without limitation so long as it is typically used in an electrolyte solution for a lithium secondary battery. For example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^{31}$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN$, and $(CF_3CF_2SO_2)_2N$ may be used as an anion of the lithium salt.

In the electrolyte solution used in the present invention, an organic solvent included in the electrolyte solution may be used without limitation so long as it is typically used in the electrolyte solution for a lithium secondary battery. Typically, any one selected from the group consisting of propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulfolane, Y-butyrolactone, propylene sulfite, and tetrahydrofuran, or a mixture of two or more thereof may be used. In particular, ethylene carbonate and propylene carbonate, ring-type carbonates among the carbonate-based organic solvents, well dissociate the lithium salt in the electrolyte solution due to high dielectric constants as high-viscosity organic solvents, and thus, the ring-type carbonate may be used. Since an electrolyte solution having high electrical conductivity may be prepared when the ring-type carbonate is mixed with low-viscosity, low-dielectric constant linear carbonate, such as dimethyl carbonate and diethyl carbonate, in an appropriate ratio, the ring-type carbonate, for example, may be used.

Selectively, the electrolyte solution stored according to the present invention may further include an additive, such as an overcharge inhibitor, which is included in a typical electrolyte solution.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used. However, the separator is not limited thereto.

A shape of the lithium secondary battery of the present invention is not particularly limited, and for example, a cylindrical type using a can, a prismatic type, a pouch type, or a coin type may be used.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present inventive concept to those skilled in the art.

EXAMPLES

Hereinafter, the present invention will be described in more detail, according to examples and experimental examples. However, the present invention is not limited thereto.

<Preparation of Anode Active Material>

Example 1

SiO (average particle diameter of 4 μm to 7 μm) was added to $Fe(NO_3) \cdot 6H_2O$. Subsequently, the mixture thus obtained was dried and then heat treated to disperse a Fe catalyst on surfaces of silicon oxide particles.

The silicon oxide particles having the Fe catalyst dispersed on the surfaces thereof were put in a chemical vapor deposition (CVD) chamber and a composite was then obtained by growing carbon nanofibers on the silicon oxide particles while argon (Ar) gas was supplied for five minutes and a predetermined amount of ethylene ($C_2H_4$) gas was then supplied at a temperature of about 900° C.

An amount of the grown carbon nanofibers was about 5 parts by weight based on 100 parts by weight of the silicon oxide particles. It was observed that the prepared carbon nanofibers were non-uniform and had a diameter of 20 nm to 200 nm.

In order to remove the Fe catalyst impregnated in the composite thus prepared, the composite was immersed in a 10% hydrochloric acid solution, and the solution was stirred for 24 hours and filtered. Then, vacuum drying was performed at 100° C. for 12 hours. Thereafter, 5 g of the dried composite was put in a horizontal furnace and the temperature was increased to 900° C. while supplying helium gas (200 ml/minute). Then, an anode active material, in which the surfaces of the silicon oxide particles and the carbon nanofibers grown on the silicon oxide particles were coated with carbon, was obtained by supplying methane gas (160 ml/minute) and hydrogen gas (40 ml/minute) at 900° C. for 30 minutes.

Comparative Example 1

An anode active material was prepared in the same manner as in Example 1 except that after carbon nanofibers were grown on silicon oxide particles, a process of forming a carbon coating layer on the silicon oxide particles and the grown carbon nanofibers was not performed.

<Preparation of Lithium Secondary Battery>

Example 2

The anode active material prepared in Example 1, a styrene-butadiene rubber (SBR) as a binder, carboxymethyl cellulose (CMC) as a thickener, and acetylene black as a conductive agent were mixed at a weight ratio of 95:2:2:1 and the mixture thus obtained was mixed with water ($H_2O$) as a solvent to prepare a uniform anode slurry. One surface of a copper current collector was coated with the prepared anode slurry to a thickness of 65 μm, dried and rolled. Then an anode was prepared by punching into a predetermined size.

Ethylene carbonate (EC) and diethyl carbonate (DEC) were mixed at a volume ratio of 30:70, and $LiPF_6$ was added to the non-aqueous electrolyte solvent thus prepared to prepare a 1 M $LiPF_6$ non-aqueous electrolyte solution.

Also, a lithium foil was used as a counter electrode, i.e. a cathode, a polyolefin separator was disposed between both electrodes, and a coin-type lithium secondary battery was then prepared by injecting the electrolyte solution.

Comparative Example 2

A coin-type lithium secondary battery was prepared in the same manner as in Example 2 except that the anode active material prepared in Comparative Example 1 was used.

Experimental Example 1

<Scanning Electron Microscope (SEM) Image 1: Comparative Example 2>

Figure 2:
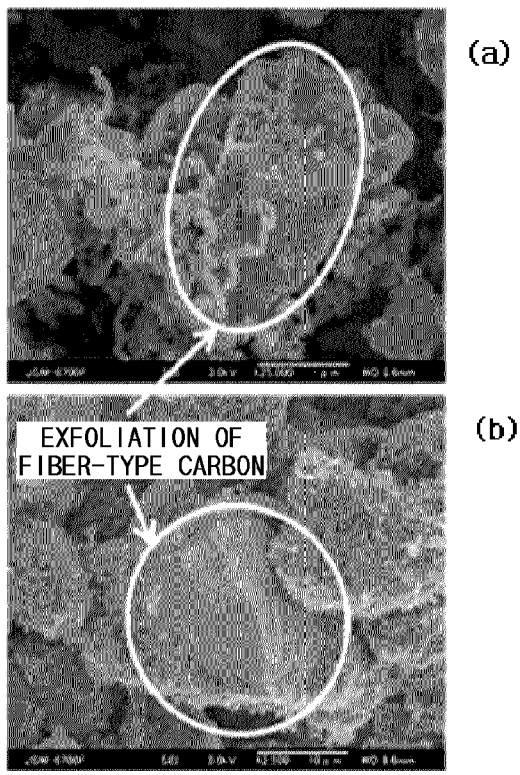
FIG. 2 is scanning electron microscope (SEM) images of a surface of an anode prepared in Comparative Example 2.

A surface of an anode of the lithium secondary battery of Comparative Example 2, in which the anode active material prepared in Comparative Example 1 was used, was identified by SEM images and the results thereof are presented in FIG. 2. FIGS. 2(a) and 2(b) were SEM images at high magnification and low magnification, respectively.

As illustrated in FIG. 2, in a case where a carbon coating layer was not formed on the surfaces of silicon oxide particles and carbon nanofibers grown on the silicon oxide particles as in Comparative Example 2, it may be confirmed that the carbon nanofibers almost did not remain because the carbon nanofibers were exfoliated from the silicon oxide particles.

That is, in a case where the anode active material of Comparative Example 1 was used, it may be understood that fiber-type carbon was exfoliated from the silicon oxide particles during the preparation of the anode slurry or the operation of the battery.

<SEM Image 2: Example 2>

Figure 3:
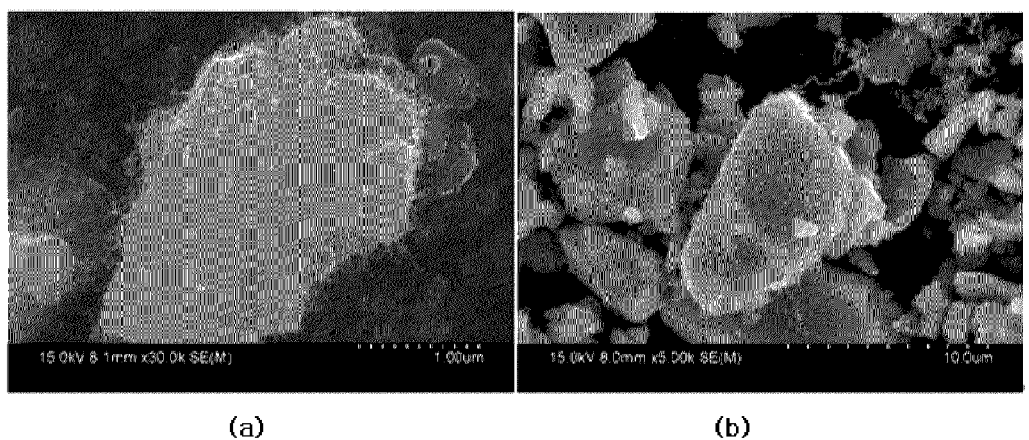
FIG. 3 is SEM images of a surface of an anode prepared in Example 2 according to an embodiment of the present invention.

A surface of an anode of the lithium secondary battery of Example 2, in which the anode active material prepared in Example 1 was used, was identified by SEM images and the results thereof are presented in FIG. 3. FIGS. 3(a) and 3(b) were SEM images at high magnification and low magnification, respectively.

As illustrated in FIG. 3, in a case where a carbon coating layer was formed on the surfaces of silicon oxide particles and carbon nanofibers grown on the silicon oxide particles as in Example 2, it may be confirmed that the carbon nanofibers were not exfoliated from the silicon oxide particles, but combined with the silicon oxide particles.

That is, in a case where the anode active material of Example 1 was used, it may be understood that the carbon nanofibers were physically and strongly combined with the silicon oxide particles during the preparation of the anode slurry or the operation of the battery.

Experimental Example 2

<Cycle Characteristics>

Charge and discharge characteristics were evaluated for the lithium secondary batteries of Example 2 and Comparative Example 2 by using a charge and discharge machine (WBCS 3000 by WONA TECH).

The lithium secondary batteries (battery capacity: 3.4 mAh) prepared in Example 2 and Comparative Example 2 were charged at a constant current (CC) of 0.1 C to a voltage of 2 V, and thereafter, charge in the first cycle was performed by charging the lithium secondary batteries at a constant voltage (CV) to a current of 0.17 mAh. After the batteries were left standing for 10 minutes, discharge capacities in the first cycle were measured by discharging the batteries at a constant current of 0.1 C to a voltage of 10 mV. Subsequently, with respect to each battery of Example 2 and Comparative Example 2, the charge and discharge were repeated 100 cycles to measure discharge capacity for each cycle. The results thereof are presented in Table 1.

TABLE 1

| Examples | Discharge capacity (mAh/g) | Initial efficiency (%) | Lifetime characteristics (%) |
|---|---|---|---|
| Example 2 | 1,620 mAh/g | 75.4% | 95% |
| Comparative Example 2 | 1,635 mAh/g | 74.8% | 89% |

Initial efficiency: (first cycle discharge capacity/first cycle charge capacity)×100

Lifetime characteristics: (discharge capacity in a 49th cycle/first cycle discharge capacity)×100

As illustrated in Table 1, with respect to Example 2 in which an anode active material that includes a carbon coating layer formed on the surfaces of SiO particles and fiber-type carbon was used, it may be confirmed that initial efficiency and lifetime characteristics were better than those of Comparative Example 2 in which an anode active material that did not include a carbon coating layer on the surfaces of SiO particles and fiber-type carbon was used. In particular, it may be understood that the lifetime characteristics of Example 2 was increased to about 6% in comparison to Comparative Example 2.

Since a carbon coating layer was formed on the surfaces of the SiO particles and the fiber-type carbon, the bonding force between the surfaces of the SiO particles and the fiber-type carbon may be further increased to prevent the exfoliation of the fiber-type carbon that may occur due to the volume change of SiO. Thus, it may be estimated that the initial efficiency and cycle characteristics of the secondary battery was improved.

INDUSTRIAL APPLICABILITY

Since an anode active material of the present invention, in which a carbon coating layer is formed on surfaces of silicon oxide particles and fiber-type carbon grown on the silicon oxide particles, may secure sufficient conductivity even in the case in which a small amount of a conductive agent is used and may further increase the bonding force between the surfaces of the silicon oxide particles and the fiber-type carbon, the initial efficiency and cycle characteristics of a secondary battery may be further improved. Thus, the anode active material may be suitable for secondary batteries.

The invention claimed is:

1. An anode active material comprising:
   silicon oxide particles represented by the following chemical formula:

$SiO_x$, where x satisfies 0<x<2;

fiber-shaped carbon grown on the silicon oxide particles; and
   a carbon coating layer formed on surfaces of the silicon oxide particles and the fiber-shaped carbon,
   wherein the anode active material comprises the fiber-shaped carbon in an amount of 0.1 parts by weight to 5 parts by weight based on 100 parts by weight of the silicon oxide particles.

2. The anode active material of claim 1, wherein the fiber-shaped carbon comprises carbon nanotubes, carbon nanofibers, or a mixture thereof.

3. The anode active material of claim 1, wherein the fiber-shaped carbon has a diameter of 1 nm to 500 nm and a length of 100 nm to 5 μm.

4. The anode active material of claim 1, wherein an average particle diameter of the silicon oxide particles is in a range of 4 μm to 45 μm.

5. The anode active material of claim 1, wherein a coating amount of carbon in the carbon coating layer is in a range of 5 parts by weight to 20 parts by weight based on 100 parts by weight of the anode active material.

6. The anode active material of claim 1, wherein the carbon coating layer covers the entire surfaces of the silicon oxide particles and the fiber-shaped carbon.

7. A method of preparing an anode active material, the method comprising the steps of:
   (i) forming a composite by dispersing a catalytic metal on silicon oxide particles and performing a heat treatment in the presence of a carbon source to grow fiber-shaped carbon, wherein the silicon oxide particles are represented by the following chemical formula:

SiO$_x$, where x satisfies 0<x<2; and (ii) forming a carbon coating layer by coating the composite with carbon and performing a heat treatment, wherein the anode active material comprises the fiber-shaped carbon in an amount of 0.1 parts by weight to 5 parts by weight based on 100 parts by weight of the silicon oxide particles.

8. The method of claim 7, wherein the fiber-shaped carbon comprises carbon nanotubes, carbon nanofibers, or a mixture thereof.

9. The method of claim 7, wherein the fiber type shaped carbon has a diameter of 1 nm to 500 nm and a length of 100 nm to 5 μm.

10. The method of claim 7, wherein an average particle diameter of the silicon oxide particles is in a range of 4 μm to 45 μm.

11. The method of claim 7, wherein the heat treatment in the step (i) is performed in a temperature range of 100° C. to 1,000° C.

12. The method of claim 7, wherein the carbon source comprises any one selected from the group consisting of methane, ethane, ethylene, butane, acetylene, carbon monoxide, propane, and propylene, or a mixture of two or more thereof.

13. The method of claim 7, wherein the catalytic metal comprises any one selected from the group consisting of iron (Fe), nickel (Ni), cobalt (Co), calcium (Ca), yttrium (Y), and magnesium (Mg), or a mixed metal of two or more thereof.

14. The method of claim 7, wherein the carbon coating comprises coating by pyrolytic carbon using any one selected from the group consisting of methane, ethane, ethylene, butane, acetylene, carbon monoxide, propane, and propylene, or a gas-phase or liquid-phase carbon source of two or more thereof; or coating by liquid-phase and solid-phase pitch.

15. The method of claim 7, wherein the heat treatment in the step (ii) is performed in a temperature range of 300° C. to 1,400° C.

16. The method of claim 7, wherein a coating amount of carbon in the carbon coating layer is in a range of 5 parts by weight to 20 parts by weight based on 100 parts by weight of the anode active material.

17. An anode comprising a current collector and the anode active material of claim 1 formed at least one surface of the current collector.

18. A lithium secondary battery comprising a cathode, the anode of claim 17, and a separator disposed between the cathode and the anode.

* * * * *